United States Patent [19]

Taguchi

[11] Patent Number: 4,906,221

[45] Date of Patent: Mar. 6, 1990

[54] CONTINUOUSLY VARIABLE TRANSMISSION WITH UNIQUE FLUID FLOW PATH STRUCTURE

[75] Inventor: Hiromi Taguchi, Zama, Japan

[73] Assignee: Nissan Motor Co., Ltd., Yokohama, Japan

[21] Appl. No.: 260,217

[22] Filed: Oct. 20, 1988

[30] Foreign Application Priority Data

Oct. 23, 1987 [JP] Japan .................................. 62-266228

[51] Int. Cl.$^4$ ............................................ F16H 57/04
[52] U.S. Cl. ..................................................... 474/93
[58] Field of Search ................... 474/93, 8, 16, 18, 28, 474/43, 45, 69, 70; 74/867–869

[56] References Cited

U.S. PATENT DOCUMENTS 4,583,423  4/1986  Hahne .............................. 474/28 X
4,673,379  6/1987  Ohzono et al. ....................... 474/28

FOREIGN PATENT DOCUMENTS 58-67158  5/1983  Japan .

*Primary Examiner*—Thuy M. Bui
*Attorney, Agent, or Firm*—Foley & Lardner, Schwartz, Jeffery, Schwaab, Mack, Blumenthal & Evans

[57] ABSTRACT

A continuously variable transmission includes a pipe attached to the inner wall of a side cover of a casing. The pipe defines a part of a fluid supply path to a fluid pressure chamber of a follower pulley.

8 Claims, 3 Drawing Sheets

CONTINUOUSLY VARIABLE TRANSMISSION WITH UNIQUE FLUID FLOW PATH STRUCTURE

BACKGROUND OF THE INVENTION

The present invention relates to a continuously variable transmission and more particularly to a fluid flow path structure of a continuously variable transmission.

JP-U 58-67158 discloses a continuously variable transmission. In this known continuously variable transmission, passages are formed in a side cover of a casing and define a part of a fluid flow path conducting oil to and from a fluid pressure chamber of a follower pulley. The oil from this passage os the side cover is supplied to the fluid pressure chamber of the follower pulley via an axial passage formed in a follower shaft. The passages of the side cover are composed of a plurality of bores which are formed by casing or machining.

This known fluid flow path structure results in an increase in overall axial dimension of the continuously variable transmission, posing a problem that it becomes difficult to install the continously variable transmission in a smaller sized vehicle. The fluid flow path is composed of bores formed by casting and machining, so that the side cover has to be formed with an increased thickness portion which such bores are formed through. This causes an axial expansion of the side cover, resulting in an increase in overall axial dimension of the continuously variable transmission. Particularly, that portion of the side cover which is positioned near the follower pulley has to be mounted near a vehicle body member, so that the expansion of this portion of the side cover makes it very difficult to install the continuously variable transmission in a smaller sized vehicle.

An object of the present invention is to provide a continuously variable transmission with an unique fluid flow path whereby the axial overall dimension of the transmission is reduced.

SUMMARY OF THE INVENTION

According to the present invention, a fluid flow path for conducting a hydraulic fluid to a fluid pressure chamber of a follower pulley is partly defined by a pipe attached to the inner wall of a side cover, thereby to solve the above-mentioned problem.

In one form of the present invention, a continuously variable transmission is provided with:
- a casing including a main body and a side cover secured to the main body;
- a V-belt power transmission mechanism mounted within the casing and including a driver pulley, a follower pulley, and a V-belt drivingly interconnecting the driver and follower pulleys, the follower pulley including a fluid pressure chamber;
- means defining a fluid flow path having one end communicating with the fluid pressure chamber of the follower pulley,
- the fluid flow path defining means including a pipe attached to the inner wall of the side cover.

DETAILED DESCRIPTION OF THE INVENTION

Figure 1:
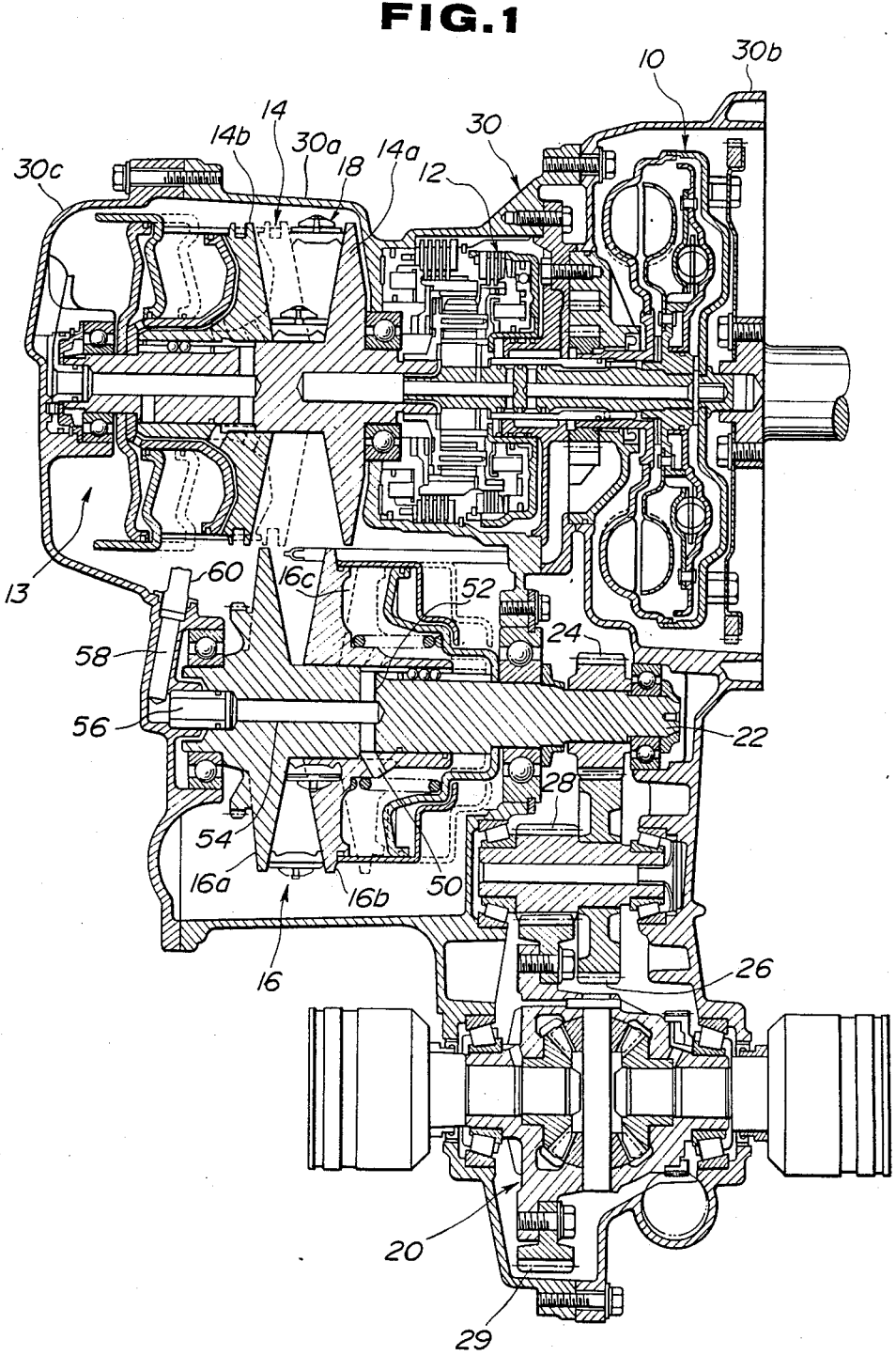
FIG. 1 is a sectional view of a V-belt type continuously variable transmission taken along lines to show the inside of a casing with component parts in operatively associated manner.
Figure 3:
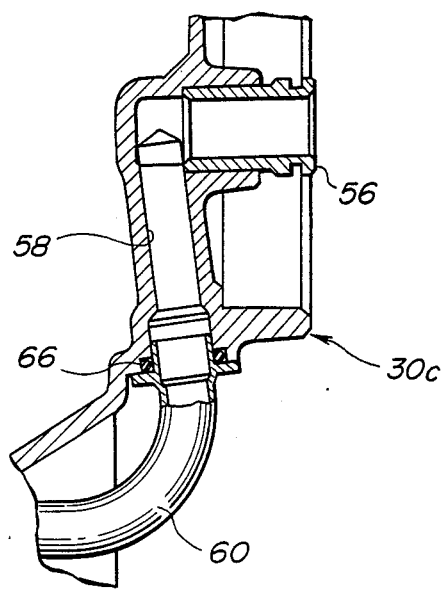
FIG. 3 is a fragmentary section taken along the line III—III of FIG. 2.

Referring to FIG. 1, a continuously variable transmission comprises a hydrokinetic unit in the form of a fluid coupling 10, a forward/reverse selector mechanism 12 including a clutch, brake and a planetary gear set, a V-belt power transmission mechanism 13, and a differential mechanism 20. The V-belt power transmission mechanism 13 includes a driver pulley 14, a follower pulley 16 and a V-belt 18 drivingly interconnecting these pulleys. Torque from the engine is delivered to the fluid coupling 10, forward/reverse selector mechanism 12, driver pulley 14, V-belt 18, follower pulley 16, and differential mechanism 20 in this order. The driver pulley 14 includes an axially fixed conical part 14a, and an axially movable conical part 14b such that the spacing of a V-shaped groove defined between these conical parts is variable by axially moving the axially movable conical part 14b. Likewise, the follower pulley 16 includes an axially fixed conical part 16a, and an axially movable conical part 16b such that the spacing of a V-shaped groove defined between these conical parts is variable by axially moving the axially movable conical part 16b. The axial movement of the axially movable conical part 16b is controlled by a hydraulic servo including a fluid pressure chamber 16c. Integral with the axially fixed conical part 16b is a follower shaft 22. The follwer shaft 22 is drivingly connected via gears 24, 26, and 28 with a final gear 29 of the differential mechanism 20. The forward/reverse selector mechanism 12, V-belt power transmission mechanism 13, and differential mechanism 20 are mounted within a casing 30. The casing 30 is an assembly of a casing main body 30a, a housing 30b, and a side cover 30c which are secured one after another by means of bolts. The side cover 30c is formed with an integral sleeve 56 and a bore 58. As best seen in FIG. 3, the bore 58 has one end closed and an opposite end opened, and; one end of the sleeve 56 is connected with the bore 58 at a portion near the closed end thereof. The opposite end of the sleeve 56 is connected to an axial passage 54 formed through the follower shaft 22. Radially extending from this axial passage 54 are a plurality of radial passages 52 formed through the follower shaft 22. The axially movable conical part 16b is formed with a plurality of holes 50 via which the pressure chamber 16c communicate with the radial passages 52.

Figure 2:
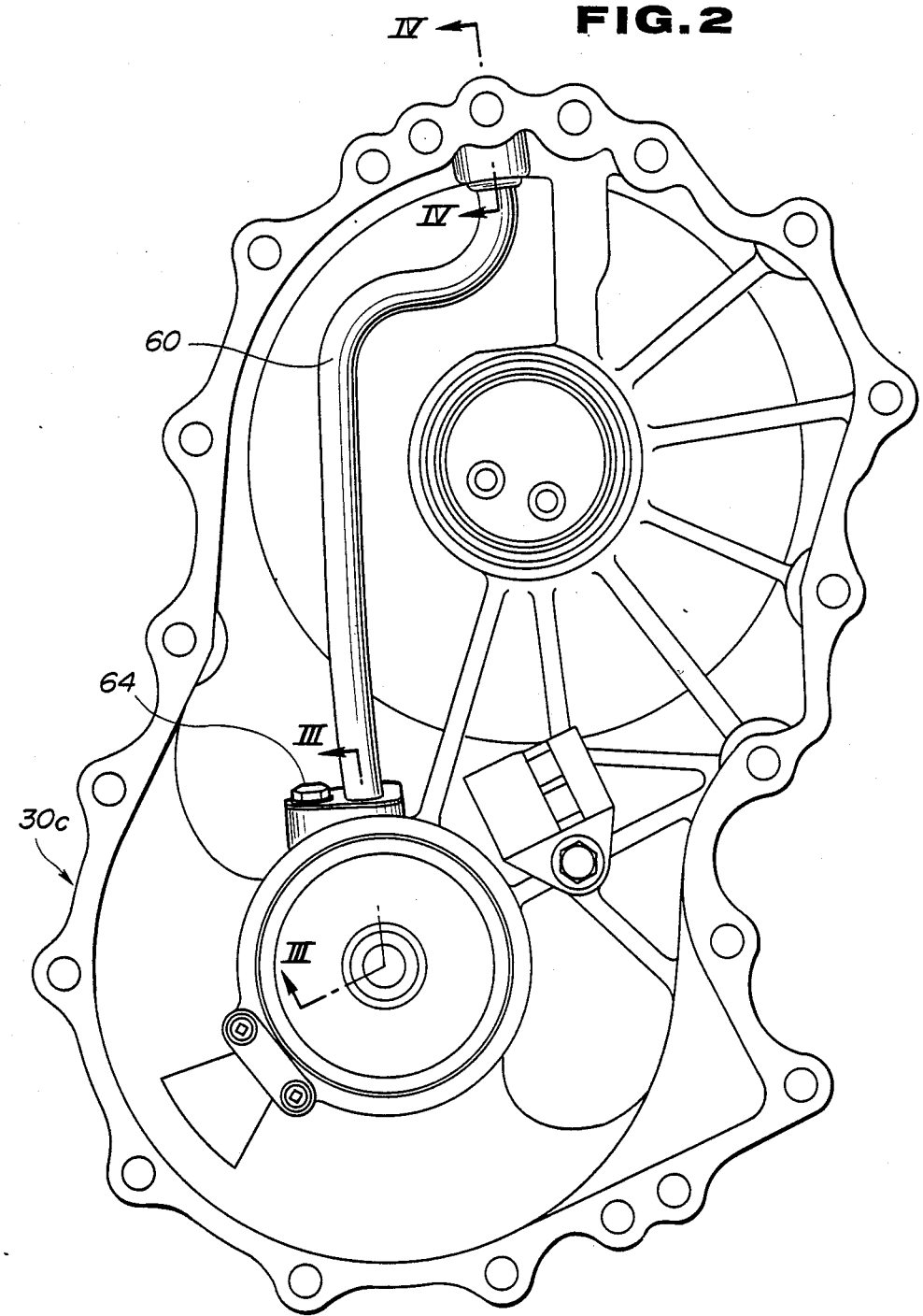
FIG. 2 is a side cover of a casing as viewed from the inside, showing how a pipe is mounted.
Figure 4:
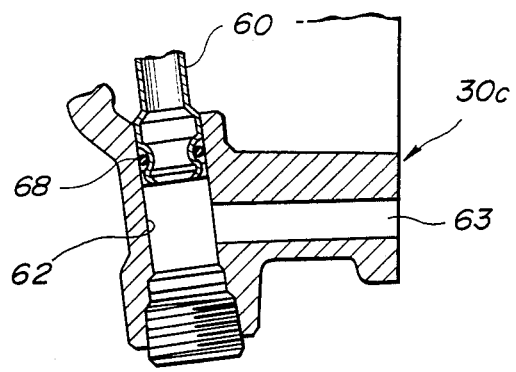
FIG. 4 is a fragmentary section taken along the line IV—IV of FIG. 2.

As best seen in FIG. 3, the bore 58 receives at its opposite open end one end of a pipe 60. An O-ring 66 is disposed between the open end portion of the bore 58 and a flange of the pipe 60 to seal a space between bore 58 and this flange. As shown in FIG. 2, this pipe 60 extends along the side cover 30C and has an opposite end inserted into a bore 62 formed through another portion of the side cover 30c as shown in FIG. 4. As best seen in FIG. 4, the opposite end of the pipe 60 is inserted into the bore 62 in a seal tight manner using an O-ring 68. Connected to this bore 62 is an oil supply or discharge passage 63. This oil supply passage 63 is supplied with a working oil from a control valve assembly, not shown. As will be readily understood from FIG. 4, the bore 62 slidably receives the opposite end of the pipe 60, and the O-ring 68 seals a space formed between the periphery of the opposite end portion of the pipe 60 and the adjacent bore defining wall. As best seen in FIG. 2, the pipe 60 is curved so that its two ends are not aligned. In assembly, the opposite end of the pipe 60 is inserted into the bore 62 and then turned through a predetermined angle with its opposite end remaining insertedin the bore 62, and then the one end of the pipe 60 is inserted into the bore 58.

The working oil supplied from the control valve, not shown, flows through the casing main body 30a, the oil supply passage 63, bore 62, pipe 60, bore 58, sleeve 56, axial passage 54, radial passages 52, bores 50 to the pressure chamber 16c. The axially movable conical part 16b of the follower pulley 16 is movable responsive to pressure build-up within the pressure chamber 16c. In this manner, the oil is supplied via the pipe 60. Therefore, it is not necessary for the side cover to be formed with an increased thickness portion which a fluid passage is to be formed through. The pipe 60 extends through a clearance space formed between the inner wall of the side cover 30c and the driver pulley 14. Since this clearance space has not been used, it is not necessary to extends the side cover 13c axially outward. Therefore, the overall axial dimension of the continuously variable transmission has been reduced according to the present invention. Particularly, that portion of the side cover 30c which is positioned near the follower pulley 16 has to be mounted adjacent a vehicle body member. Since the increased thickness of the side cover 30c has been eliminated according to the present invention, the installation of the continuously variable transmission to a smaller sized vehicle has been enhanced.

What is claimed is:

1. In a continuously variable transmission:
   a casing including a main body and a side cover secured to said main body, said side cover including a first portion and a second portion distant from said first portion;
   a V-belt power transmission mechanism mounted with said casing and including a driver pulley, a follower pulley, and a V-belt drivingly interconnecting said driver and follower pulleys said follower pulley including a fluid pressure chamber;
   means defining a fluid flow path having one end communicating with said fluid pressure chamber of said follower pulley,
   said fluid flow path defining means including a pipe attached to said side cover, said pipe having one end inserted into said first portion of said side cover and an opposite end inserted into said second portion of said side cover to establish a fluid flow communication between said first and second portions of said side cover.

2. A continuously variable transmission as claimed in claim 1, wherein said side cover has an inner wall, and said pipe extends along said inner wall of said cover.

3. A continuously variable transmission as claimed in claim 2, wherein said first portion of said side cover is formed with a bore and has a sleeve attached thereto with one end opening into said bore and an opposite end communicating with said fluid pressure chamber of said follower pulley, and wherein said pipe has one end inserted into said bore.

4. A continuously variable transmission as claimed in claim 3, wherein said V-belt power transmission includes a follower shaft rotatable with said follower pulley, wherein said fluid flow path defining means include an axial passage and radial passages extending from said axial passage which said follower shaft is formed with, and wherein said sleeve has the opposite end thereof opening to said axial passage.

5. A continuously variable transmission as claimed in claim 3, wherein said fluid flow path defining means include an O-ring disposed between said one end of said pipe and said bore of said first portion of said side cover.

6. A continuously variable transmission as claimed in claim 5, wherein said pipe includes a flange adjacent to said one end therof and in abutting engagement with said first portion of said side cover.

7. A continuously variable transmission as claimed in claim 3, wherein said second portion of said side cover is formed with a bore, and said opposite end of said side cover is inserted into said bore of said second portion of said side cover in an axially slidable manner.

8. A continuously variable transmission as claimed in claim 7, wherein said fluid flow path defining means include another O-ring disposed between said opposite end of said pipe and said bore of said second portion of said side cover.

* * * * *